United States Patent [19]

Eberly

[11] Patent Number: 4,504,939

[45] Date of Patent: Mar. 12, 1985

[54] STORAGE MEDIUM TRACK PITCH DETECTOR

[75] Inventor: Carlyle J. Eberly, Long Beach, Calif.

[73] Assignee: Discovision Associates, Costa Mesa, Calif.

[21] Appl. No.: 329,462

[22] Filed: Dec. 10, 1981

[51] Int. Cl.³ .............................. G11B 3/82; G11B 3/90
[52] U.S. Cl. ............................................. 369/46; 369/54
[58] Field of Search ....................................... 369/44–46, 369/54, 97, 109–111; 358/342; 350/380; 250/553, 204, 201

[56] References Cited

U.S. PATENT DOCUMENTS 4,167,024  9/1979  Hamisch ......................... 369/110 X
4,283,777  8/1981  Curry et al. ..................... 365/234 X
4,290,122  9/1981  Bates et al. ........................ 365/234

Primary Examiner—Aristotelis M. Psitos
Attorney, Agent, or Firm—Ronald J. Clark

[57] ABSTRACT

Method and apparatus for measuring the spacing between adjacent information tracks on a recording medium. A spot of light is projected onto at least a portion of a first track and maintained in a constant spacing from a second track. A photodetector detects the amount of light reflected off of the disc from the spot in a predetermined direction, and provides an electrical signal as an output. The photodetector output provides a measurement of the track-to-track spacing of the recording medium.

10 Claims, 37 Drawing Figures

STORAGE MEDIUM TRACK PITCH DETECTOR

BACKGROUND OF THE INVENTION

1. Field of the Invention

The present invention relates to data storage media, and more particularly relates to a method and apparatus for measuring the spacing between adjacent tracks in a data storage medium. The invention is especially adaptable to track pitch measurement in connection with optical discs.

2. Brief Description of the Prior Art

The optical disc is a high density information storage medium which is used to record television program material for later playback as well as for other uses such as computer data storage.

Optical discs are typically made of a durable, clear plastic material formed in a disc approximately the size of an LP phonograph record. Information is stored inside the disc in an embedded surface having a uniform optical property such as reflectance. Tiny indicia, or areas in the surface having the uniform optical property altered, for example having decreased reflectance, are sequentially arranged on the surface in the form of tracks. These tracks are arranged as concentric circles or as a single continuous spiral. Information is represented in the variation in the spatial frequency of the indicia in the track, as well as in the relative size of the indicia as compared with the "lands" of unaltered surface between them. For example, one common form of optical disc, used in the recording of video information, has a reflective surface embedded in the interior of the disc, in which the indicia are tiny pits.

The disc is read by a player apparatus which images a tiny "reading" spot of light onto a track and moves the spot of light relative to the track. The reflected signals modulated by the pits and lands are gathered, and the stored information is recovered from the reflected light signal. The spot of light is kept centered on the track by means of a servo system which utilizes two auxiliary spots of light stradling opposite sides of the track, in a manner known in the art. A detailed description of such an optical disc player can be found in co-pending U.S. patent application Ser. No. 131,513, commonly assigned to the assignee of the present invention.

Optical discs provide high density information storage by virtue of the extremely small size of the information-containing indicia which make up the tracks of the disc, and the small track-to-track spacing, or "pitch". Such indicia typically vary in length in a range from approximately 0.75 micron to 1.25 micron. Track pitch is typically of the order of 1.5 to 2.0 microns. The reading spot of light for optical discs is correspondingly small. In order to be able to retrieve the information stored on the disc it is important that the reading spot of light be maintained centered on the track and that the tracks be sufficiently spaced from one another that the amount of light which is reflected off of adjacent tracks is kept to a reasonable minimum.

In this connection, it is known that it is impossible to create such a tiny spot of light which has perfectly sharp borders. Therefore, even if a circular spot of light having a diameter less than a track width is perfectly centered on a track, some light from the spot will impinge on adjacent tracks and thereby create a signal component from the adjacent tracks. This component is called "crosstalk", and if it is large enough it can cause objectionable interference with the recovered information signal. It is, therefore, important that the track pitch be chosen so as to provide an acceptably low level of crosstalk and that that track pitch be maintained at a fairly constant value. In addition, it is important that abrupt deviations in track pitch be avoided, because such deviation can cause the tracking servo to exceed its limits resulting in picture dropout or skipping from track to track.

The aforementioned track pitch deviations in optical discs are produced by more than one source in the disc manufature process. In addition, the characteristics of the deviations vary with the particular source. For example, the formation of the tracks of indicia in the manufacturing process is typically done using a "writing" spot of laser light which exposes a layer of photoresist, melts holes in a layer of metal, or the like, in the pattern the tracks ultimately take. Oscillations in the objective lens tracking servo system for the "writing" laser can give rise to track pitch variations having a relatively high spatial frequency. On the other hand, eccentricities in the lead screw, which is used to drive the objective lens assembly radially to cause the tracks to spiral, can give rise to track pitch variations having a significantly lower spatial frequency than those from the objective lens servo system.

In order to monitor the quality of the optical disc manufacturing process, it is, therefore, desirable to have the capability to measure track pitch deviations with a sufficient degree of accuracy so as to be able to not only detect the presence of track pitch variations, but also to detect the characteristics of those variations, for example, spatial frequency. Knowledge of the characteristics of track pitch variations can aid in pinpointing those defective or marginal components which are their source. Such knowledge can also be used to ascertain whether the track pitch variations are of an unacceptable magnitude.

Until now, however, the method employed in commercial optical disc manufacture to detect track pitch variations directly has been to put the disc under a microscope and have an individual look at various areas on the disc. This has not proved to be a very satisfactory technique because the disc is very large compared with the field of view of the microscope and, consequently, inspecting the entire disc is extrememly time-consuming. In addition, track pitch variations of significance may occur in spatial patterns which are relatively large as compared with a microscope field of view. While it may be possible to detect the existence of an individual track pitch variation of this kind, patterns of occurrence of such deviations may easily elude the observer. In addition, because the visual field of the microscope covers such a tiny portion of a group of tracks, it is difficult to compare observed track deviations between different observations through the microscope, even those covering relatively closely spaced fields, so as to correlate observed deviations and thereby obtain information concerning deviations of a particular track.

It will, therefore, be appreciated that there is a need for an apparatus capable of providing accurate measurements of variations in the spacing of adjacent tracks in an information storage medium such as an optical disc. Further, there is a need for an appratus capable of providing accurate measurement of track pitch in an optical disc over the entire information area of the disc in a relatively short amount of time.

The present invention satisfies these needs.

SUMMARY OF THE INVENTION

The present invention resides in an apparatus for measuring the spacing between adjacent information tracks on an information storage medium, such as an optical disc. A spot of light is projected onto at least a portion of a first track, and a photodetector dectects the amount of light reflected off of the disc in a predetermined direction and provides an output electrical signal representative thereof. The apparatus maintains a substantially constant lateral spacing of the spot of light from a second track which is parallel to the first track. Relative motion is provided between the spot of light and the disc in a direction substantially parallel to the second track. In this way the spot of light is scanned along the first track maintained in a substantially fixed relative spacing with respect to the second track. The spatial distribution of light which emerges from the medium provides a measurement of the relative spacing between the two tracks. For example, the amount of light reflected from the disc which can be detected at a particular location can be related directly to track pitch.

The present invention provides several important advantages over the prior art. To begin with, the invention allows direct measurement of track-to-track spacing, or pitch, in real time as an optical disc is scanned. This measurement is in the form of an electrical signal which can be related quantitatively to the actual instantaneous track pitch. This signal can be used to drive, for example, an oscillograph to obtain a permanent record of the track pitch of an entire optical disc. This represents an major improvement over prior art approaches.

Secondly, the present invention can be constructed by performing just a few minor modifications to existing commercially available optical disc player apparatus. Thus, advantage may be taken of existing commercially available devices to relatively easily achieve the precision which is needed to practice the invention in connection with high density optical discs.

It will be appreciated from the foregoing that the present invention represents a significant advance in the field of optical disc manufacturing quality control, as well as in the field of measurement in general. In particular, the invention provides a rapid and highly accurate apparatus and method for measuring the track-to-track spacing in information storage discs, especially optical discs. Other aspects and advantages of the present invention will become apparent from the following more detailed description, taken in conjunction with the accompanying drawings.

DETAILED DESCRIPTION OF THE PREFERRED EMBODIMENT

Figure 1:
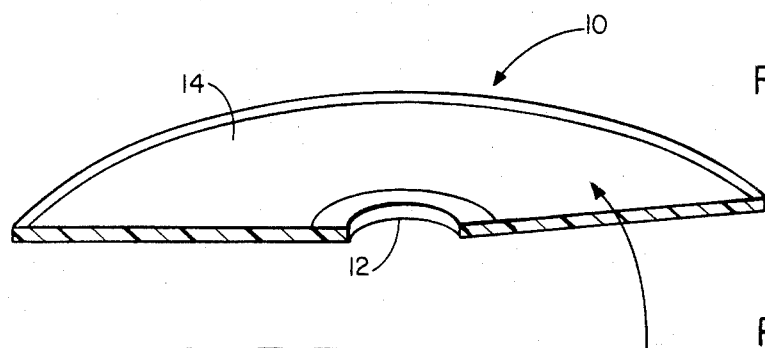
FIG. 1 is an orthogonal view of a section of and optical disc.

FIG. 1 is an orthogonal view of a section of an optical disc. The disc 10 is circular, roughly the size of an LP phonograph record, and has a central aperture 12 to permit the disc to be placed on a spindle (not shown) for high speed rotation. In the interior of the disc 10, is an information storage surface 14 having an area corresponding in size approximately to the grooved area of a phonograph record. This information-storage surface 14 has a uniform optical property, such as reflectance or transmittance. Arranged throughout this surface 14 in sequential fashion in tracks having a spiral configuration are a series of indicia, or tiny areas in the surface which affect light differently then the surface surrounding them, for example by causing scattering of the light reflected therefrom as compared with uniform mirror reflection from the surrounding surface.

Figure 2:
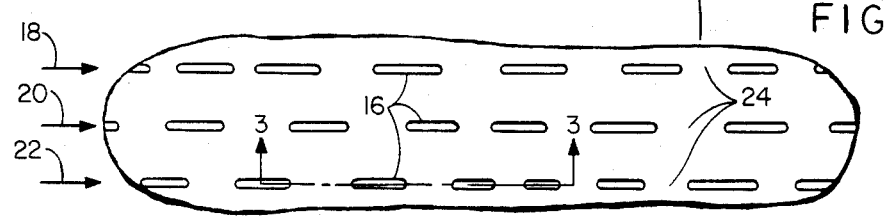
FIG. 2 is a plan view of a small section of the recording surface in an optical disc.

FIG. 2 is a plan view of a small section of the information-storage surface 14 of the disc 10 shown in FIG. 1. Three adjacent tracks of indicia 16 are shown, identified by arrows 18, 20 and 22. As can be seen, the indicia 16 are arranged sequentially in each track, defining areas having optical properties altered from the optical properties of the "lands" 24 of reflective material between them.

Figure 3:
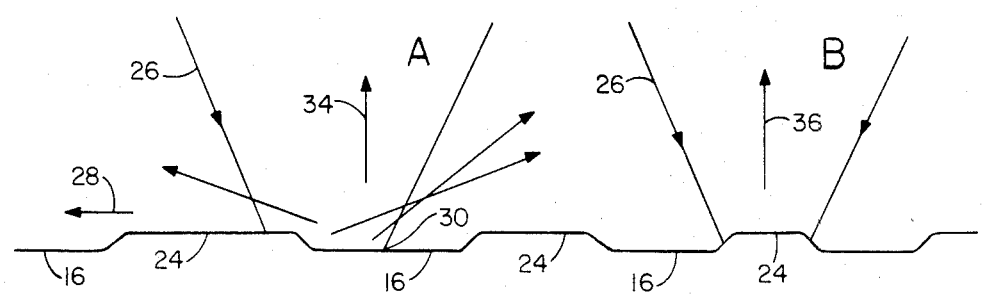
FIG. 3 is a cross-section view through lines 3—3 of FIG. 2.

FIG. 3 is a cross-section view through line 3—3 in FIG. 2, showing a cross section of a segment of track 22. A beam 26 of reading laser light imaged by an objective lens (not shown) is shown centered over a pit 16 in a first position A. The light beam 26 is also shown at a second location B over a land 24. It will be understood that the track 22 moves laterally with respect to the light beam 26, as depicted by arrow 28, and therefore the beam position B corresponds to a later point in time than position A in the scanning process.

The beam 26 of reading light is imaged to a spot 30 on the track 22. In position "A" the spot 30 overlaps a pit 16 which diffracts a substantial portion of the light as depicted by arrows 32. Some of the light reflects back toward the lens in the direction of the incident beam 26, as depicted by arrow 34. However, due to the diffraction, some of the light is reflected off into different directions, as depicted by arrows 36, 38, and therefore not all of the light passes back through the objective lens. Other effects such as phase cancellation of portions of the light reflected back through the objective lens also serves to decrease the amount of light detected when the spot 30 is on a pit 16.

In position B the beam 26 of reading laser light is imaged onto the surface of a land 24. This surface is flat and reflective and, consequently, most of the light is reflected back in the direction of the objective lens. In fact, most of the light reflected at position B passes back through the lens.

Optical disc player systems will utilize the objective lens configuration depicted in FIG. 3 utilize a photodetector which detects the laser light which is reflected back through the objective lens.

Typically, a beam-splitter is used to separate the reflected light from the incident light beam. As discussed above in connection with FIG. 3, the amount of light which is reflected back through the objective lens depends upon whether the beam 26 of incident light is imaged at a pit 16 or a land 24. Consequently, as the spot 30 of laser light is scanned along a track 22, the output of the photodetector detecting the reflected light through the objective lens 26 varies in accordance with the pattern of arrangement of pits 16 and lands 24 along the track.

Figure 4:
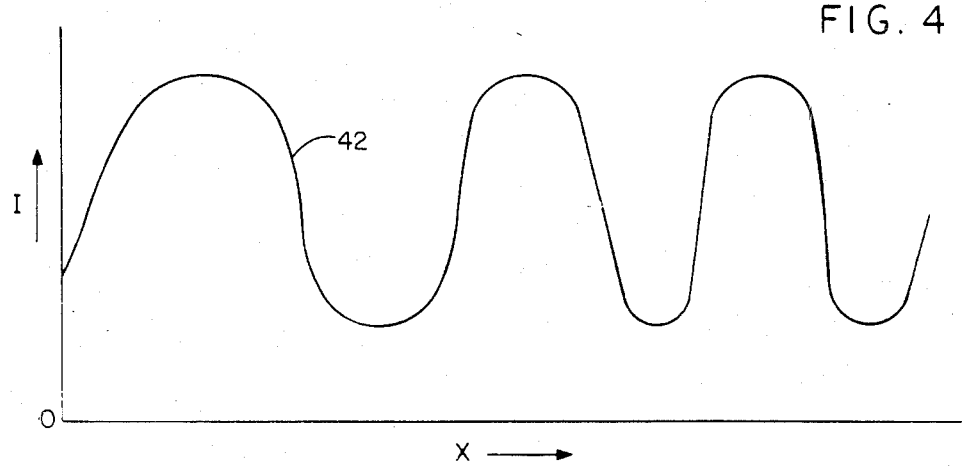
FIG. 4 is a graph showing a plot of the output of a photodetector detecting the reflected light from a spot of light reading the track shown in FIG. 3.

FIG. 4 shows a plot 42 of the output of such a photodetector for a player system detecting the light from a spot of light reading the section of track depicted in FIG. 3.

Figure 5:
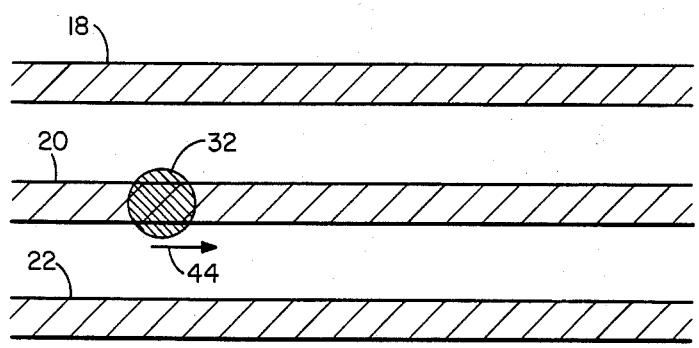
FIG. 5 is a plan view of a portion of three information tracks on an optical disc.

FIG. 5 depicts a portion of the three tracks 18, 20 and 22 shown in FIG. 2 and the imaged spot 32 of reading laser light centered on the center track 20. Individual indicia are not shown because they do not play a role in the practice of the present invention, except in that the indicia cause the average level of reflectance in a track as it is scanned to be less than that in the area between tracks.

As previously mentioned, the spot 32 of light is not a point, but rather the spot 32 occupies a roughly circular area centered on the track 20. The spot 32 defines an area where only the major portion of the reading laser light is incident on the disc, while other components of the light beam 28 (FIG. 3), such as defraction components, lie outside of the area of spot 32 shown in FIG. 5. This fact plays a role which is discussed further below. Nonetheless, most of the light from the beam falls within the spot 32 shown in FIG. 5. In a player the spot 32 is moved along the track 20 in a direction depicted by arrow 44, and the spot 32 thereby scans along the track.

Figure 6:
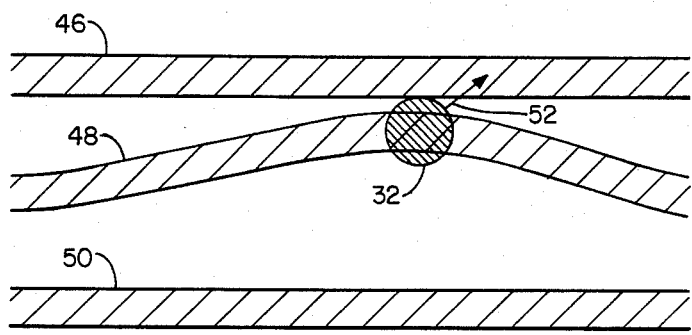
FIG. 6 is a plan view as in FIG. 5, only showing a track pitch deviation.

FIG. 6 shows three tracks 46, 48 and 50 wherein the center track 48 deviates from the desired position with respect to the adjacent tracks 46 and 50. In fact, it will be noted that the center track 48 nearly contacts the upper track 46. This configuration is shown as a "kissing track" configuration and it can cause two principal kinds of problems. First, most optical disc players include a tracking servo system to maintain the spot 32 of light centered on the track which is being read. Such a servo system has limits and those limits can be exceeded. For example, in the case depicted in FIG. 6 the abrupt deviation of the track 48 from its desired configuration and the close proximity to the adjacent track 46 can provide an ambiguous instantaneous state for the servo, and the spot 32 of light may actually leave the track 48 and start tracking on the adjacent track 46, as shown by arrow 52. This condition can lead to skipping from track to track, similar to the effects produced by a scratch on an LP phonograph record.

Second, even if the tracking servo system maintains the spot 32 centered on the track 48, in the vicinity where the two tracks 46, 48 come together, a much greater amount of the light outside the boundary of the spot 32 is incident on the adjacent track 46, and consequently, the level of "cross talk", or signal pick-up from the adjacent track 46 rises considerably.

The present invention is concerned with detecting this kind of track pitch deviation.

Figure 7:
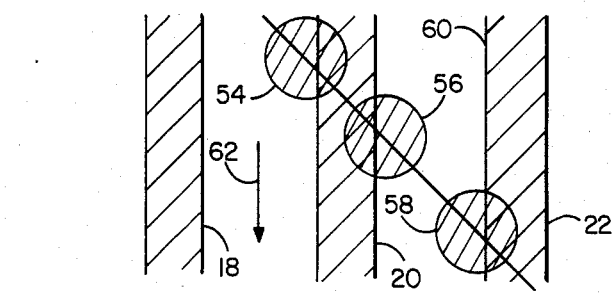
FIG. 7 is a plan view of a portion of three tracks, showing a configuration of spots of light imaged thereon in accordance with the principles of the present invention.

FIG. 7 shows the track and light spot configuration of the preferred embodiment of the present invention. Two spots 54 and 56 straddle opposite sides of a track 20 which serves as a reference track. A third spot 58 impinges on a portion of an adjacent track 22, preferably such that the inner edge 60 of the adjacent track 22 bisects the third spot of light 58. The three spots 54, 56, 58 are moved together in the direction of reference track 20 in a manner discussed below.

Figure 8:
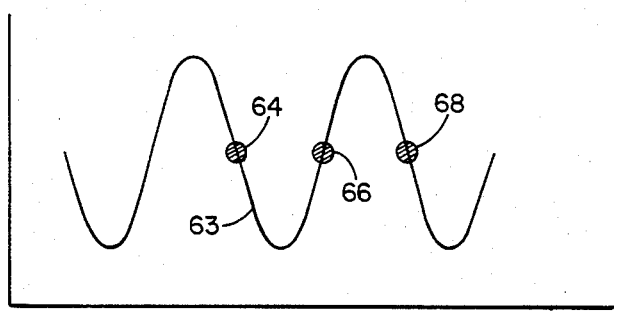
FIG. 8 is a graph showing a plot of the output of a photodetector detecting the light reflected from a spot of light in the vicinity of the three tracks shown in FIG. 7.

The light from each of the spots 54, 56, 58, which is reflected back from the reflected surface through the objective lens (FIG. 3), is detected by one of three photodetectors (not shown). FIG. 8 is a plot 63 of the intensity of light from a spot of light which is reflected off of the reflective surface and detected by such a photodetector. The horizontal axis represents the location of the spot of light of the surface in the direction perpendicular to the track axes, and the vertical axis represents light intensity. As can be seen, the intensity of such light is greater for a spot in the area between tracks and least for a spot centered on a track. Three points 64, 66, 68 are identified on the plot 63, corresponding to the intensity of light detected by the respective photodetectors associated with the spots 54, 56 and 58 (FIG. 7). Thus, a photodetector associated with spot 54 receives an intensity of light represented by point 64 in FIG. 8, while one associated with spot 56 receives an amount of light represented by point 66, and one associated with spot 58 an amount represented by point 68. It will be appreciated that the plot 63 also corresponds to the output voltage of a photodetector receiving the light reflected from the surface. The points on the plot 63, and on similar plots which will be described below, will for the sake of consistency be referred to as photodetector voltage plots.

Figure 9:
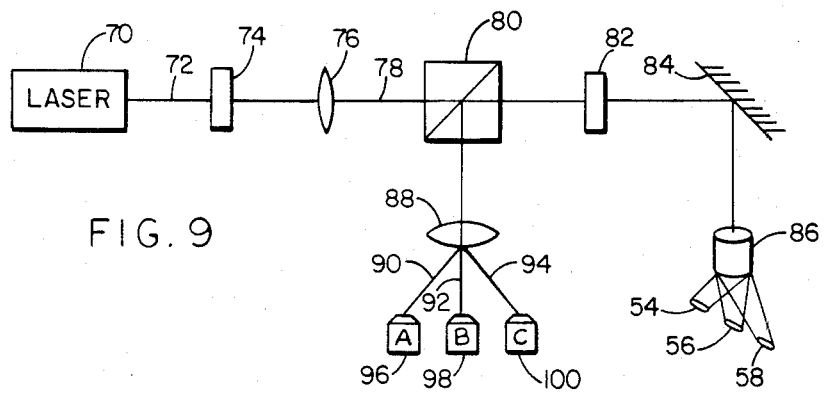
FIG. 9 is a schematic diagram of an optical system constructed according to the principles of the present invention.

FIG. 9 is a schematic diagram of an optical system for generating the three spots of light 54, 56, 58 shown in FIG. 7. A source of polarized laser light 70 outputs a beam 72 which passes through a defraction grating 74 which splits the beam 72 into three closely spaced beams 78. After passing through the defraction grating 74, the beam 72 of laser light passes through a diverging lens 76. After passing through the diverging lens 76, the three beams 78 pass through a polarizing beam splitter 80 to a quarter wavelength plate 82. The beams 78 are then reflected off a mirror 84 which directs them through a microscope objective lens 86. The lens 86 images the three beams 78 onto the reflective surface of an optical in three separate spots 88, 90 and 92. That portion of the light from the three spots of laser light 54, 56, 58, which is reflected back through the objective lens 86, passes back along substantially the same path to the mirror 84 where it is directed to the quarter wavelength plate 82. Having passed twice through the quarter wavelength plate 82, the polarization of the reflected light is rotated by 90° with respect to the incident light beam 72. This back-reflected light is therefore reflected at the polarizing beam splitter 80 toward a focusing lens 88. The focusing lens 88 focuses the three components of light 90, 92, 94 to three photo detectors 96, 98, 100, as shown. The outputs of each of the photo detectors 96, 98, 100 represents the amount of light reflected back through the objective lens 86 from each of a different one of the three spots of light 54, 56 and 58.

Figure 10:
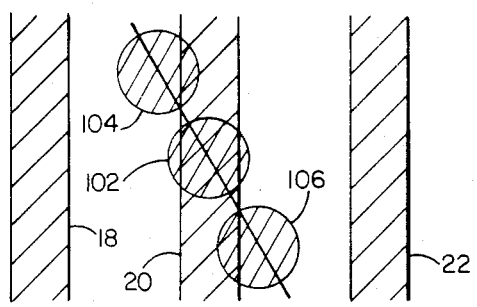
FIG. 10 is a view showing a track and a light spot configuration produced by a conventional optical disc player apparatus.

The arrangement shown schematically in FIG. 9 can be constructed by modifying an existing optical disc player apparatus. All optical disc player apparatus must have a subsystem for maintaining the reading spot of laser light centered on the track being read. A common form of such subsystem is a servo system which utilizes two auxiliary spots of light adjacent the reading spot of light. FIG. 10 is a diagram showing the configuration of the spots of laser light used in an optical disc player apparatus having such a tracking servo system. Three tracks 18, 20 and 22 are shown. The center track 20 is read by the center spot of laser light 102. Two other, auxiliary spots of light 104 and 106 are provided straddling opposite edges of the track 20 being read. The three spots of light 102, 104 and 106, are generated by the placement of a diffraction grating in the path of a single beam of laser light in the manner shown in FIG. 9. The grating is selected and placed in the optical system so as to produce spots spaced from the reading spot by a predetermined desired distance. The grating is also rotated by an amount sufficient to place the auxiliary spots 104 and 106 at their desired locations straddling opposite edges of the track 20 being read. The photodectors associated with the spots 102, 104 and 106 corresponding to photo detectors 96, 98 and 100 in FIG. 9, are arranged so that each photodetector detects the light reflected back from a different one of the three spots on the reflective surface of the optical disc. The outputs of the photodetectors detecting the light from the auxiliary spots 104 and 106 are provided to a tracking servo (not shown) and the signals are used to maintain the reading spot 102 of laser light centered on the track 20, as is well known in the art.

Such a system can be modified to produce the configuration of spots of light shown in FIG. 7. To do this, it is only necessary to rotate the existing diffraction grating by the proper amount so as to produce the alignment of spots shown in FIG. 7. The photodetectors associated with the three spots of light are then appropriately modified in position so as to detect the light from the respective spots of light.

Figure 11:
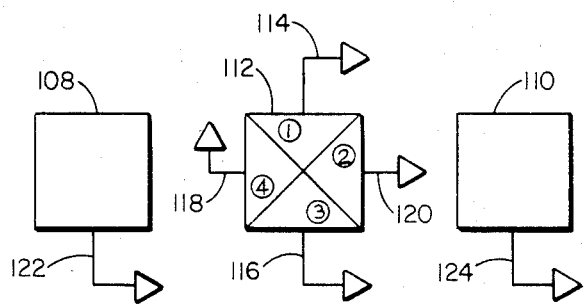
FIG. 11 is a diagram of three photodetectors such as used in a conventional optical disc player apparatus.

In addition, the electronics associated with the outputs of the photodetectors are modified in a manner discussed below to account for the fact that the center spot is no longer used as a reading spot, but is rather used as a tracking spot (FIG. 7). FIG. 11 depicts three photodetectors used in a connection with a player apparatus having the servo system described above. Two auxiliary spot photodetectors 108 and 110 are shown, as well as a third, quadrant photo detector 112 for the light from the reading spot of laser light. As is known in the art, a quadrant photodetector is provided for the reading spot of laser light in order to generate information concerning the focus of the reading spot of laser light. This information is provided to a focus servo system to maintain the reading spot of laser light in a focused condition on the track of the disc. Outputs from opposite quandrants are combined, and the two resulting signal lines are used as inputs to the focus servo system. Thus, for example, outputs 114 and 116 are combined, as are outputs 118 and 120. Each of the auxiliary beam photodetectors 108 and 110 have a single output line 122 and 124, respectively.

Figure 12:
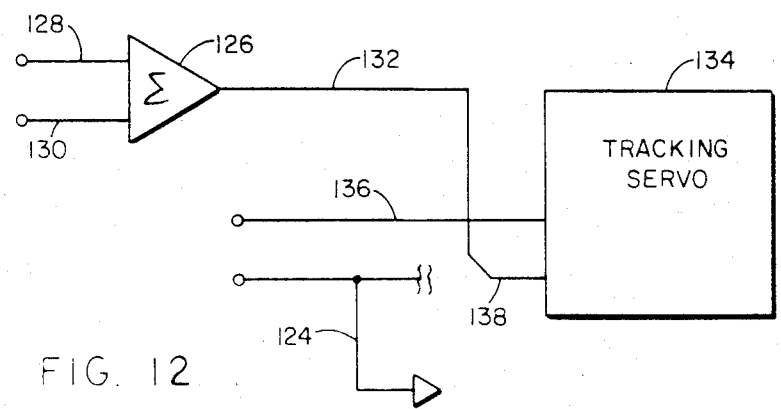
FIG. 12 is a block diagram of a portion of a tracking servo system of a conventional optical disc player apparatus modified in accordance with the principles of the present invention.

FIG. 12 shows a portion of a player apparatus circuitry modified in accordance with the present invention. A summer is provided, having two input lines 128 and 130. The output from combined signal lines 114 and 116 (FIG. 11) is applied to line 128 of the summer 126, while the output from combined lines 118 and 120 (FIG. 11) is applied to line 130 of summer 126. The output 132 of summer 126 thus represents the total amount of light incident on the quadrant photo detector 112.

As shown, the tracking servo 134 has two input lines 136 and 138. Ordinarily, the input line 138 is connected to the output 124 of the auxiliary beam photo detector 110, and the output line 136 is connected with the output line 122 of the auxiliary spot photo detector 108. However, in accordance with the present invention, the input line 138 is disconnected from the output line 124, and instead, the output line 132 from the summer 126 is applied to the input line 138, as shown. Input line 136 to the tracking servo 134 remains connected to the output line 122 of the photo detector 108. In this way, the center spot 102 (FIG. 10), ordinarily used as a read spot in the player apparatus, in connected to serve as the second tracking spot. The output 124 of the third photo detector 110 is thus freed for use as a track pitch measurement signal in connection with the principles of the present invention in a manner described below. It should be noted that the output 124 can also be used as a signal source for the information recorded on the disc in addition to its function as a measurement signal. Thus, a video optical disc can be played and the recovered video picture observed as the measurement of track pitch is performed. This permits correlation between track pitch and observed picture.

Figure 13:
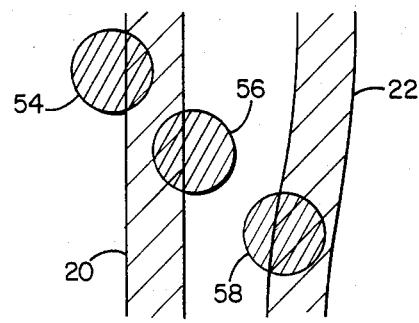
FIG. 13 is a view similar to that shown in FIG. 7, only showing a track pitch deviation.

Referring now to FIG. 13, the operation of the preferred embodiment of the present invention will now be described. FIG. 13 is a diagram similar to that shown in FIG. 7 in that a reference track 20 is shown having the tracking spots 54 and 56 straddling it, while a third, auxiliary spot 58 straddles an adjacent track 22. The spots 54, 56, 58 are generated in the manner described above. As can be seen, the adjacent track 22 is somewhat curved from its ideal path of constant spacing with respect to the reference track 20. Consequently, the track spacing between track 20 and track 22 is decreased in the vicinity of the curve. It should be noted that the proportions of the track curve are compressed for purposed illustration. Actual track pitch curves occur over distances that range up to one or two inches.

In FIG. 13, the auxiliary spot of light 58 is shown impinging on the auxiliary track 22 in the vicinity of the curved region of that track. As can be seen by a comparison of FIG. 13 with FIG. 7, a larger percentage of the auxiliary spot 58 lies on the track 22 as compared with the "normal" track configuration shown in FIG. 7.

Figure 14:
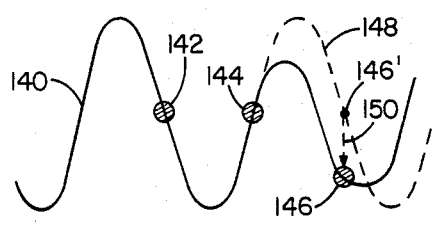
FIG. 14 is a graph showing a plot of the output of a photodetector detecting the light reflected from the spot of light in the vicinity of the two tracks shown in FIG. 13.

FIG. 14 is a graph showing a plot of the voltage of the photodetector output for the detected light from a spot reflected back off of the reflective surface. The horizontal axis represents a direction perpendicular to the tracks shown in FIG. 13, in the plane of the disc. Three points 142, 144 and 146, corresponding to the photodetector outputs for the three spots 54, 56 and 58, respectively, are shown on the plot 140. It will be appreciated that the voltages represented by points 142 and 144 are used for tracking purposes only, and will therefore remain relatively constant as the apparatus scans along the tracks. The voltage at spot 146 in FIG. 14 represents the signal utilized in the measurement of the spacing between track 20 and track 22.

For comparison purposes the photodetector output plot corresponding to an undeviated track 22 is shown in dashed line 148 on FIG. 14. Thus, it will be appreciated that the dashed line portion 148 corresponds exactly to that part of the plot shown in FIG. 8. A point 146' is shown on the dashed line portion 148, corresponding to the photodetector ouptut for the spot 58 which would be detected if the curve 22 were undeviated. As can be seen by the arrow 40, the curvature of the track 22 causes a distortion in the plot 140 of the photodetector output, which in turn causes the point 146' to move down, corresponding to a diminution in the amount of photodetector output voltage. The amount of decrease in the level of photodetector output, represented by the arrow 150, corresponds to the amount by which the track 22 is deviated from its ideal straight configuration.

Figure 15:
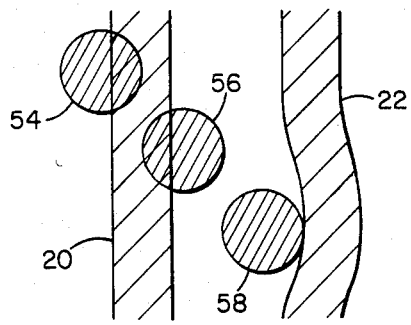
FIG. 15 is a view similar to that shown in FIG. 13, only showing a different kind of track deviation.

FIG. 15 is a diagram similar to the diagram of FIG. 13, only showing a portion of the auxiliary track 22 where it has deviated away from the reference track 20. The auxiliary spot 58, as a result, no longer straddles even a part of the adjacent track 22.

Figure 16:
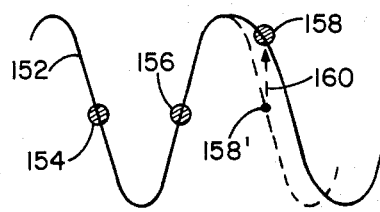
FIG. 16 is a graph showing a plot of the output of a photodetector detecting the light reflected from a spot of light in the vicinity of the two tracks shown in FIG. 15.

FIG. 16 is a graph showing a plot 152 of the photodetector output for a spot in the area of the two tracks 20 and 22 shown in FIG. 15. Three points 154, 156 and 158, corresponding to the photodetector output for each of the three spots 54, 56 and 58, respectively, are shown on the plot 152. Also shown, in dashed line, is the continuation of the plot 152 corresponding to no deviation of the adjacent track 22. It will be noted that the photodetector output at point 158 is greater than at point 158', which corresponds to the absence of track deviation. This amount of increase is shown by dashed arrow 160.

Figure 17:
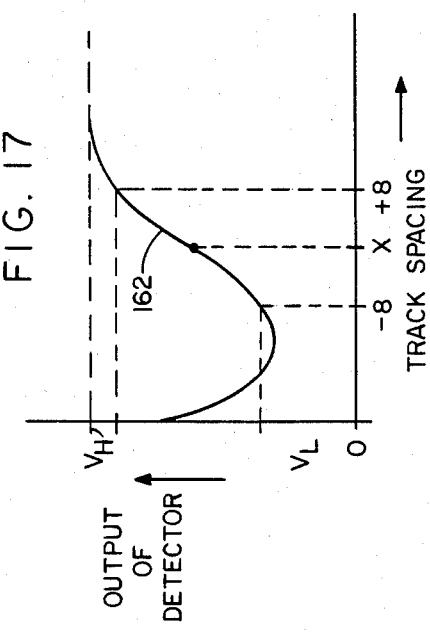
FIG. 17 is a graph showing a plot of the output of a photodetector detecting the reflected light from a light spot 58 shown in FIG. 15, plotted against track spacing.

By comparing FIGS. 13 and 14 FIGS. 15 and 16, it will be appreciated that deviations of the adjacent track 22 from the substantially straight undeviated configuration give rise to changes in the amount of light which is reflected by the auxiliary spot 58 and, consequently, to changes in the output of its corresponding photodetector. The amount of change in the photodetector output for spot 58 can be related directly, within a certain range, to the amount of deviation of the track 22 from its substantially straight, normal configuration. Knowing the difference in average reflectance of the auxiliary track 22 and the area of reflective material between tracks, the width of the track 22, and the configuration and intensity of the auxiliary spot 58, the amount of light reflected for a given spacing of the adjacent track 22 from the reference track 20 can be accurately computed. This can, in turn, be related to the output of a photodetector, such as photodetector 110 in FIG. 11. Thus a quantitative measurement of track spacing can be obtained. It should be noted that the measurement is valid only over a finite range of track pitch deviation. For example, referring to FIG. 15, for deviations of the adjacent track 22 to the right by an amount greater than that shown in the figure, no change in photodetector output for spot 58 occurs. However, over the useful range between extremes, the output of the auxiliary spot photodetector can be related quantitatively to the amount of deviation of the adjacent track 22 from its normal configuration. FIG. 17 illustrates this.

FIG. 17 is a graph showing a plot 162 of the output of the photo detector detecting the reflected light from spot 58 over a range of track spacing deviations for a reference track and an auxiliary track. It will be noted that for very large track spacings the output of the photo detector remains constant at a characteristic high voltage $V_H$. For decreasing track spacing, the photodetector output reaches a minimum, $V_L$, corresponding to the centering of the spot on the track, and then increases as the spot passes to the opposite side of the track.

In the region of a track spacing of "x", which corresponds to the nominal track spacing, the plot 162 assumes an "S" shape. The plot 162 is approximately linear in the region of track spacing between x−d and x+d where 2d represents a range of spacing producing output voltages across approximately 85% of the range of the photodetector output. In this substantially linear range, the output of the detector can be relatively accurately correlated with the actual track spacing. The output of the detector can be applied to one or more of several instruments to obtain a display or record of the track spacing for an optical disc which is scanned according to this method.

Figure 19:
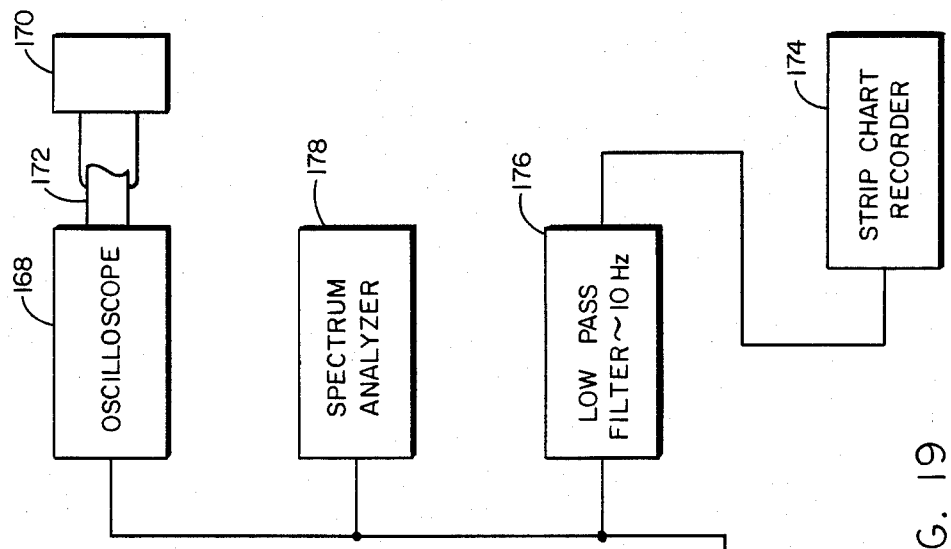
FIG. 19 is a block diagram of an arrangement of electronic instruments for monitoring and recording track pitch deviations detected in accordance with the principles of the present invention.
Figure 18:
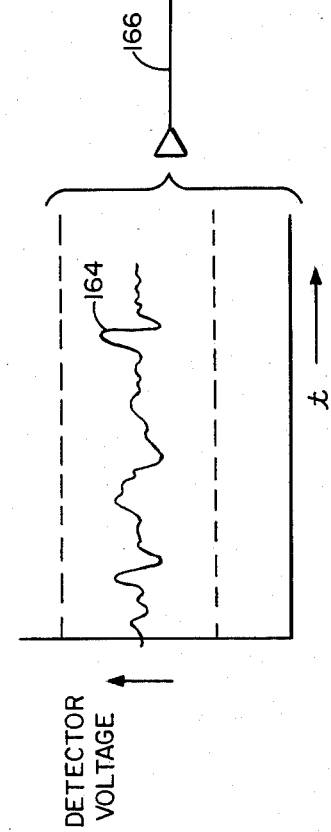
FIG. 18 is a graph showing a plot of a photodetector output versus time obtained from scanning a disc according to the principles of the present invention.

FIG. 18 is a graph showing a plot 164 of photodetector output versus time, "t", obtained from the scanning of an optical disc. FIG. 19 is a schematic diagram of a track spacing measuring set-up showing several instruments having their inputs commonly connected to a line 166 connected to the output of an auxiliary beam photodetector. An oscilloscope 168 is connected to the line 166 to provide a display of the output waveform, such as the wave form 164 shown in FIG. 18. A camera 170 is mounted on the hood 172 of the oscilloscope screen to provide a permanent record of the oscilloscope trace. A strip chart recorder 174 is connected to the line 166 through a low pass filter 176 to provide a permanent record of the low frequency components of the wave form 164 shown in FIG. 18. A spectrum analyzer 178 is connected to the line 166 to provide an analysis of the spectral components of the wave form in real time.

The low pass filter 176 and strip chart recorder 174 arrangement can be used also in connection with a slow-motion scan to provide a permanent record of relatively high frequency components of the photodetector output waveform.

The test setup shown in FIG. 19 thus provides a broad range of information for analysis of track spacing deviation for an optical disc.

Figure 20:
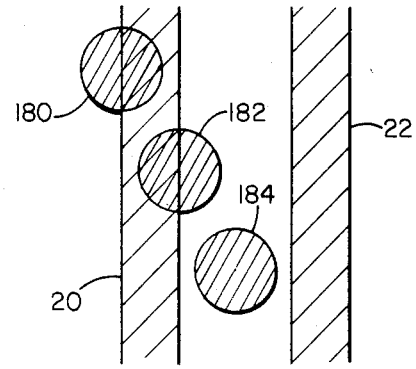
FIG. 20 is a view of a track and light spot configuration according to a further embodiment of the present invention.

The above described arrangement represents a scheme called a "linear tracking mode detector". FIG. 20 shows the track and light spot arrangement for a second mode of detection, which may be called the "non-linear" or "catastrophe" detection mode. According to this method, two adjacent tracking spots 180 and 182 are provided, as in the linear detection mode. A third spot 184 is also provided, but positioned halfway between the reference track 20 and the adjacent track 22, rather than straddling the near edge of the adjacent track 22, as in the case of linear detection method.

Figure 21:
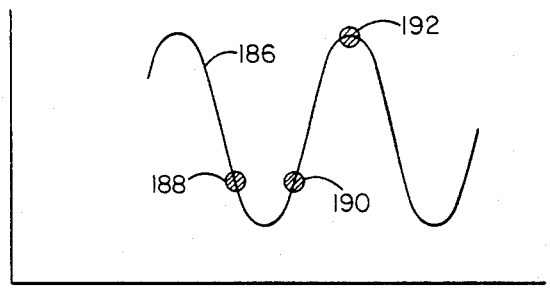
FIG. 21 is in a graph of a plot of a photodetector output in the vicinity of the two tracks shown in FIG. 20.

FIG. 21 shows a plot 186 of the amount of photodetector output for a spot of light incident in the region of the two tracks 20 and 22. The points 188 and 190 corresponding to the positions of the two tracking spots 180 and 182 are shown on the curve 186. The point 192 186 corresponding to the position of the auxiliary beam 184 is also shown on the curve. It will be noted that the point 192 lies at a location on the curve 186 where the slope of the curve 186 is a minimum and therefore the sensitivity of the arrangement to deviations in track pitch from the normal configuration is a minimum.

Figure 22:
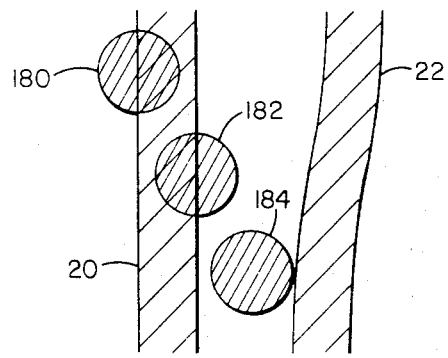
FIG. 22 is a view similar to the view shown in FIG. 20, only showing a slight track pitch deviation.
Figure 23:
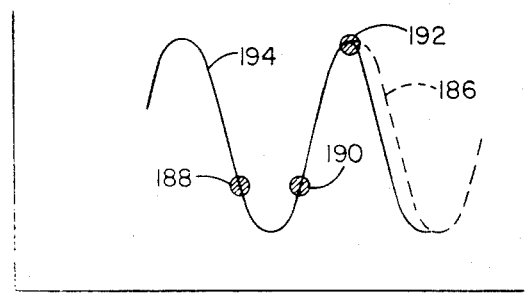
FIG. 23 is a graph showing a plot of a photodetector output for a spot of light in the vicinity of the two tracks shown in FIG. 22.

FIG. 22 is a diagram like that of FIG. 20, but showing the adjacent track 22 slightly deviated from its normal path. FIG. 23 is a graph showing a plot 194, like that shown in FIG. 21, for the configuration shown in FIG. 22. Shown in dashed line 186′ is the continuation of the plot 194 corresponding to a configuration wherein the adjacent track 22 is undeviated. It will be noted that the point 192 corresponding to the auxiliary spot 184 is substantially undeviated as compared with its location shown in FIG. 21. It will be appreciated, therefore, that the non-linear detection scheme depicted in FIGS. 20 and 22 provides minimum sensitivity to small amounts of track 22 deviation.

Figure 24:
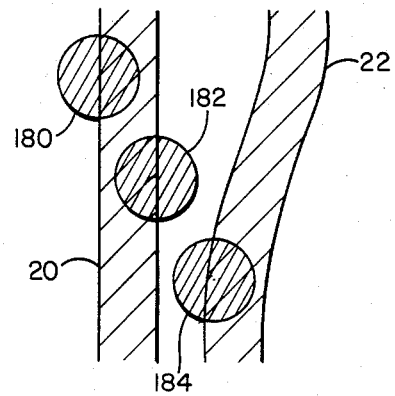
FIG. 24 is a view similar to that shown in FIG. 20 only showing a relatively large track pitch deviation.
Figure 25:
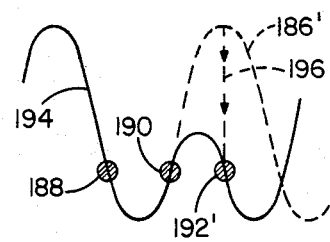
FIG. 25 is a graph showing a plot of a photodetector output of a spot of light in the vicinity of the two tracks shown in FIG. 24.

FIG. 24 is a diagram showing a track and spot arrangement like that shown in FIG. 22, wherein the adjacent track 22 is deviated by a large amount toward the reference track 20. FIG. 25 is a graph showing a plot 149 of photodetector output for a spot in the vicinity of the tracks shown in FIG. 24. The continuation 186′ of the curve 194 corresponding to the non-deviated configuration is shown in dashed line. It will be noted that the point 192′, corresponding to the photodetector output for spot 184 is deviated substantially from its normal track configuration location, as depicted by arrow 196.

The utility of the arrangement depicted in FIGS. 22 and 24 can be appreciated by comparing those figures with FIGS. 7 and 13. In FIG. 13, the adjacent track 22 is deviated a relatively small amount. Nonetheless, as will be appreciated by considering point 146 in FIG. 14, the output of the photodetector detecting detecting the reflecting light from spot 58 is near the limit of the linear detection range. In fact, as will be appreciated by considering FIG. 17, for track 22 deviations much greater than that depicted in FIG. 13, in the direction of decreasing track-to-track spacing, the level of photodetector output for the auxiliary spot 58 will go through a minimum and then actually begin to increase again, giving rise to an ambiguous result. On the other hand, referring to FIGS. 24 and 25, it will be noted that even though the adjacent track 22 is relatively largely deviated in the direction of decreasing track-to-track spacing, the location of the point 192′ on the plot 194 is within a region of relatively high sensitivity to track spacing change.

Figure 26:
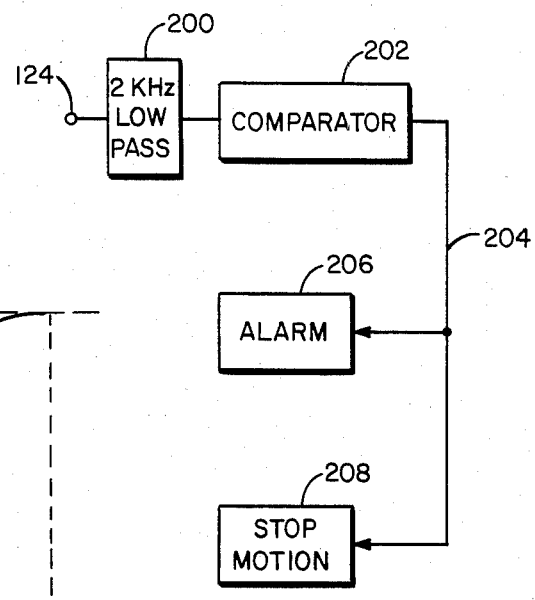
FIG. 26 is a graph showing a plot of the output of a photodetector detecting the light reflected from the spot of light 184 in FIG. 24, plotted against track spacing.

FIG. 26 is a phot of the output of the plot detector detecting spot 184 against track spacing between track 20 and 22 in the "catastroply mode" configuration shown in FIG. 20. The track spacing identified by "x" is the nominal track spacing. The region of track spacing where the detector exhibits maximum sensitivity to track spacing deviation occurs between two points, a and b, both representing track spacing less than the nominal spacing "x".

It will be appreciated that using the arrangement of instruments shown in FIG. 19 and a spot arrangement as shown in FIG. 20, large deviations in track spacing may be effectively monitored and measured. Alternatively, the spot arrangement shown in FIG. 20 may be used in connection with circuitry arranged to provide an alarm function for tracks which are excessively close as discussed below in connection with FIG. 27.

Figure 27:
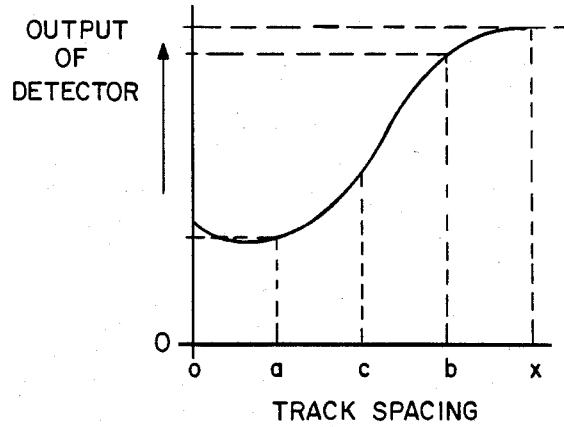
FIG. 27 is a block diagram of an arrangement of components for detecting large deviations in track pitch.

FIG. 27 is a schematic diagram of an arrangement of instruments set up in the "catastrophy" mode to provide the aforementioned alarm function in the event of excessively close tracks. The output from the auxiliary beam photodetector (line 124 in FIG. 11) is applied to a two kilohertz low pass filter 200. The output of the low pass filter 200 is applied to a comparator 202 set to provide an output when the input signal level falls below a predetermined threshold level. This threshold level voltage may be, for example, the voltage level associated with the track spacing "c" shown in FIG. 26. The output of the comparator 202 on line 204 is applied to an alarm circuit 206 and to a stop motion activating circuit 208 which can be connected to the pitch monitor apparatus to switch it to a stop motion mode. Thus, when a signal is applied to line 124 corresponding to the condition of very close track spacing, an alarm is set off and the track pitch monitoring apparatus automatically goes into stop motion mode, permitting the tracks to be studied more closely. Relatively small track spacing deviations of a minor nature will not trigger the alarm. Thus, the arrangement depicted in FIG. 27 represents a "catastrophe" mode of operation for detecting only extremely close tracks, the so-called "kissing tracks". The two kilohertz low pass filter 200 serves to prevent triggering of the alarm by spurious components such as spikes of noise.

Figure 28:
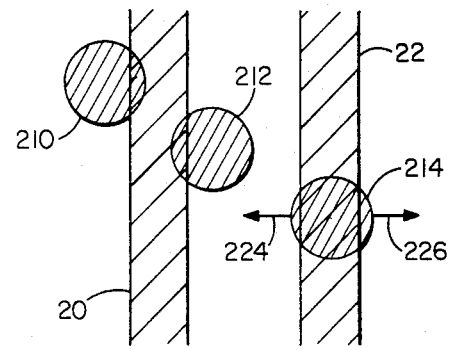
FIG. 28 is a view of a track and light tracking configuration according to a still further embodiment of the present invention.
Figure 29:
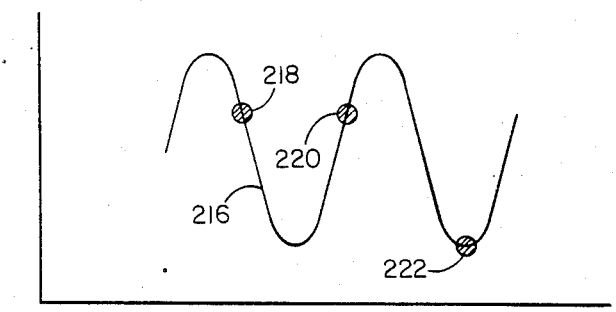
FIG. 29 is a graph showing the plot of a photodetector output for a spot of light in the vicinity of the two tracks shown in FIG. 28.

FIG. 28 is a diagram of another track and spot arrangement. According to this arrangement, two tracking spots 210 and 212 stradle a reference track 20 in connection with the tracking servo function, as in previous embodiments, while an auxiliary spot 214 is positioned centered on an adjacent track 22. FIG. 29 shows the photodetector output corresponding is spot locations in the vicinity of the tracks 20 and 22 in FIG. 28. It will be noted that the photodetector output for the auxiliary spot 214, represented by point 220 on the plot 216, is at a minimum point for the normal track configuration shown FIG. 28.

The auxiliary spot 214 in FIG. 28 is provided with adjustable lateral movement capability with the respect to the other spots 210 and 212, as shown by arrows 224 and 226. By adjusting the position of the auxiliary spot 214 so as to minimize the output of its associated photodetector, in other words by placing the point 222 at the minimum location shown in FIG. 29, and ascertaining the spot 214 position at that minimum output point, a measurement of the average track pitch is provided. This control may be exercised by rotating the diffraction grating 76 (FIG. 9) which generates the three spots of light.

Figure 30:
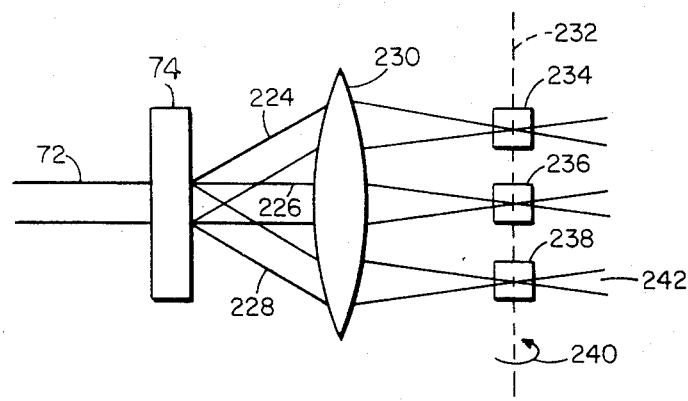
FIG. 30 is a view of an optical configuration such as used in connection with several embodiments of the present invention.
Figure 30B:
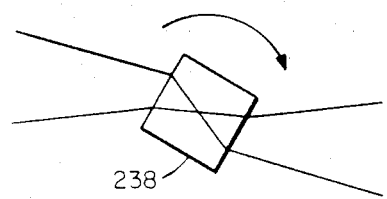
FIG. 30B is a view of a rotatable optical tube showing its influence on an imaged beam of light as it is rotated.
Figure 31:
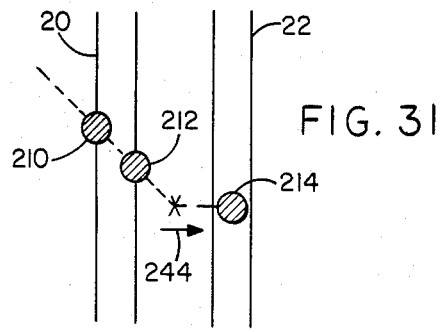
FIG. 31 is a view of a track and light spot configuration produced by the optical configuration shown in FIG. 30.

FIG. 30 is a diagram of an arrangement for providing adjustable movement capability to an auxiliary spot of light. The arrangement shown represents a modification of a portion of the system shown in FIG. 9, discussed above. The beam of laser light 72 passes through defraction grating 76 and the three beams 224, 226 and 228 pass through a focusing lens 230. The three beams 224, 226 and 228 are imaged by the lens 230 in a plane 232. Three cubes 234, 236 and 238 of transparent material such as glass are placed centered at the focal point of the three emergent beams from the lens 230. One of the outer cubes, cube 238, is provided with rotational capability about one at its axes as shown by the arrow of rotation 234. By rotating the cube 238 in the direction of the arrow 240, the beam 242 of light emerging from the cube 238 is deflected in a direction perpendicular to the reference track, as shown in FIG. 30B. FIG. 31 shows the direction of movement of auxiliary spot of light 214 from its nominal position indicated by an "X" in a direction indicated by arrow 244. Thus, the rotational capability of the glass cube 238 (FIG. 3A) provides the adjustable movement capability of the auxiliary spot 214 to permit nulling the output of the auxiliary spot photodetector to provide the track average pitch measurement function described above. In fact, the rotating glass cube 238 technique is applicable to all of the embodiments of the present invention in order to permit optimization of the grating angle for best tracking results. The static cubes 234 and 236 shown in FIG. 30 are provided to compensate for the slight change in focus caused by the presence of the rotating cube 238. Without the static cubes 234 and 236 the spot of light provided by the adjustable auxiliary beam of light 242 would be slightly out of focus.

Figure 32:
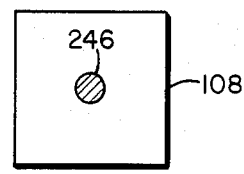
FIG. 32 is a view of the detecting surfaces of three photodetectors used in connection with the optical arrangement shown in FIG. 30.
Figure 32:
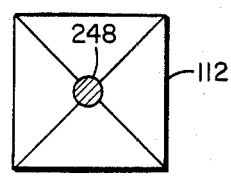
Figure 32:
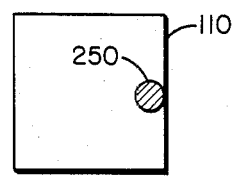

FIG. 32 is a schematic diagram of the faces of the three photodetectors 108, 112 and 110 described above in connection with FIG. 11, showing the spots of reflected light 246, 248 and 250, incident thereon. The spot 246 represents the light reflected back from spot 210 (FIG. 31), the spot 248 is the light reflected from spot 212 (FIG. 31), and the spot 250 is the light reflected from spot 214 (FIG. 31). It will be noted that the spot 250 is at the very edge of the field of the photodetector 110. Further movement in the lateral direction of the spot 214 (FIG. 31) will cause the spot 250 to begin to leave the field of the photodetector 110. This will give rise to erroneous output signals from the photodetector 110. From the foregoing it will be appreciated that the range of adjustment of the auxiliary spot 214 in the arrangement depicted in FIG. 31 is limited, and this must be taken into account when construction such a system.

Figure 33:
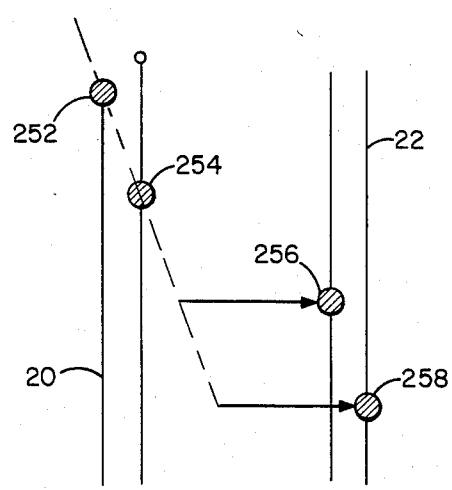
FIG. 33 is a view of a track and light spot configuration according to a still further embodiment of the present invention.
Figure 34:
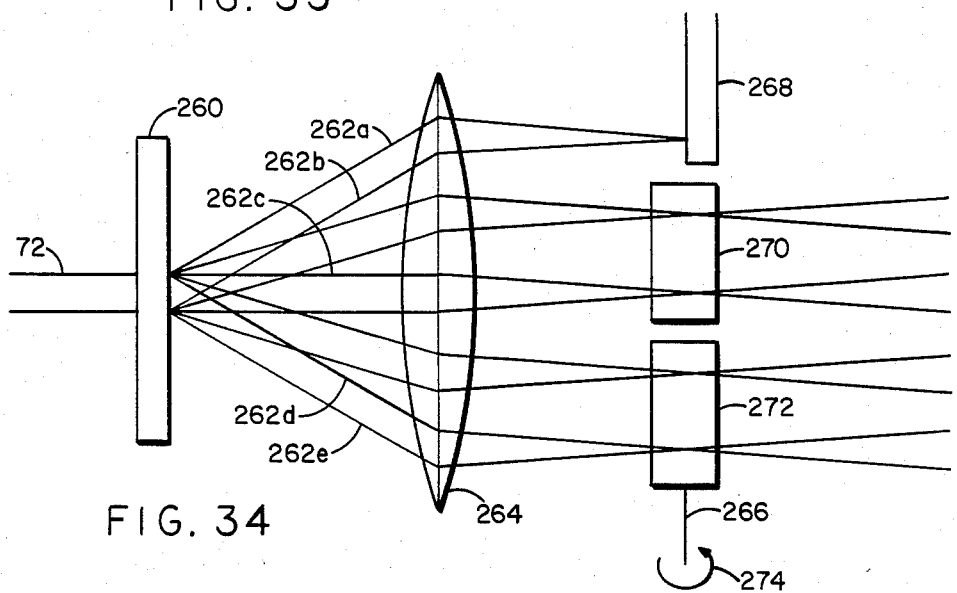
FIG. 34 is a view of an optical arrangement used to generate the track and spot configuration shown in FIG. 33.

Another configuration for track spacing detection is shown in FIG. 33. According to this configuration, two spots 252 and 254 are provided for tracking the reference track 20 and two auxiliary spots 256 and 258 are provided for tracking the adjacent track 22. According to this embodiment, two tracking servo systems may be provided one for the pair of spots associated with the reference track 20 and another for the pair of spots associated with the adjacent track 22. FIG. 34 shows a grating, lens and glass cube arrangement capable of providing the spot configuration shown in FIG. 33. A grating 260 capable of producing strong strong second order defraction components is provided in the path of the incident beam 72. The defraction grating 260 splits the beam into five strong components 262a–e. These five components pass through a diverging lens 264 which focuses the beams in a plane 266. A block 268 of opaque material blocks the path of one of the outermost beams 262a. Two beams, 262b and 262c, pass through a static glass cube 270. The remaining two beams of light 262d and 262e pass through a second, rotatable glass cube 272 which is capable of rotation about its long axis in the focal plane 266, as shown by arrow 274. By rotating the rotatable cube 272, the spots of light produced by both of the beams 262d and 262e are caused to move together in a manner depicted in FIG. 33. The rotatable cube 272 can be attached to the axis of a drive mechanism, for example a galvanometer, which is incorporated in a conventional tracking servo system (not shown). The tracking servo system will maintain the two spots of light 256 and 258 (FIG. 33) tracking on the adjacent track 22. By constantly monitoring the position voltage of the servo system associated with the two auxiliary spots of light 256 and 258, a continuous monitoring of the track spacing between the reference track 20 and the adjacent track 22 can be provided.

Figure 35:
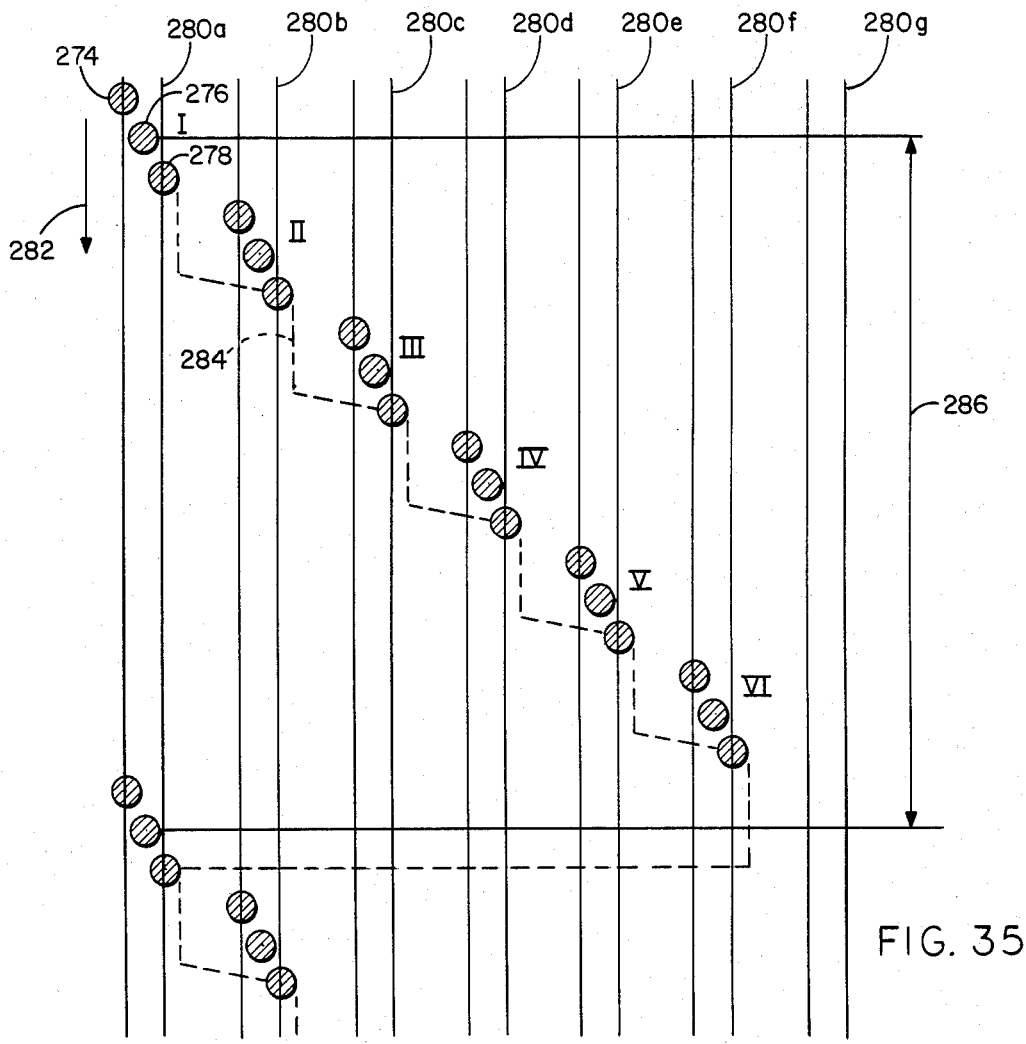
FIG. 35 is a view of a track and light spot configuration according to a still further embodiment of the present invention.

FIG. 35 illustrates the principles of operation of a still further embodiment of the present invention. According to this embodiment, three spots of light 274, 276 and 278, are provided at an initial position I in the configuration normally provided in an optical disc player apparatus. In FIG. 35 the three spots of light 274, 276, 278 are shown in a typical tracking configuration at the position I on a first track 280a, scanning in the direction depicted by arrow 282 along the track 280a. The light from two or all three of the spots is detected during the scan. After scanning a short distance, the three spots of light are abruptly shifted to a second position, II, scanning a second track 280b, and the light from the spots is detected. After scanning a short distance on track 280b, the spots are again abruptly shifted to a third position, III, and so on. This sequential, incremented scanning of the tracks continues until the sixth position, VI, is reached. After the scanning in the sixth position on track 280f, the three spots of light are returned again to the first track 280a and the process repeats. The path of the second auxiliary spot of light 278 is depicted by dashed line 284.

In order to maintain proper tracking reference for the three spots of light 274, 276, 278, a conventional sample and hold circuit is added to the player apparatus circuitry, and the photodetector outputs associated with the two auxiliary spots 274 and 278, are sampled when the three spots are in position I. The photodetector output values are held until the thre spots again return to position I, and the held signal is applied during this interval to the tracking servo system to maintain proper tracking. The rate at which the three spots sample one track and then shift to another is chosen so that the three spots return to the first track for update of the held signal at a rate greater than the tracking servo response. For example, conventional optical disc tracking servo systems are relatively insensitive to tracking feedback signal components having frequencies of approximately 40 kilohertz or greater. Thus, referring FIG. 35, by setting the sampling time rate, namely, that rate during which the three spots of light scan the distance represented by arrow 286, at 25 microseconds the tracking servo system feedback signal is refreshed at a rate of approximately 40 kilohertz. This ensures that the tracking servo response is unaffected by the sampling frequencies or the phase distortion due to the filtering of the sampled feedback signal.

Figure 36:
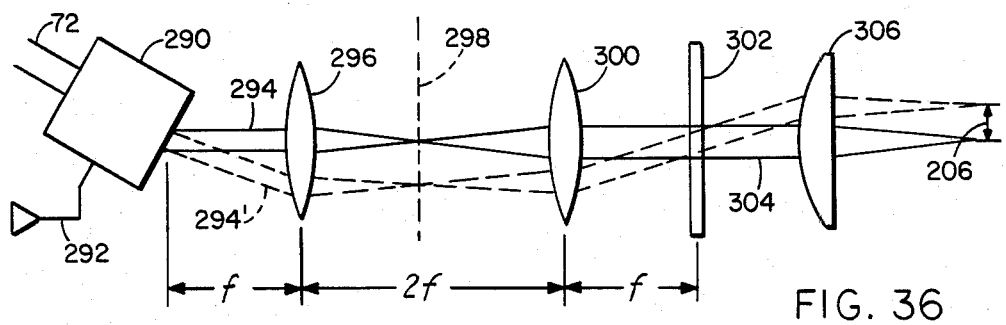
FIG. 36 is a diagram of an optical configuration used to generate the track and light spot configuration shown in FIG. 35.

FIG. 36 is a schematic diagram of an optical system for producing the sequential shifted scanning depicted in FIG. 35. A beam 72 of laser light is directed to an acousto-optical beam deflector 290, which has a measured voltage input wave form applied to its input terminals 292. The emergent beam 294 is deflected in stepped fashion according to the input signal on line 292. The emergent beam 294 is shown in solid line at one end of the range of its deflected movement. The beam 294' is shown is dashed line at the opposite end of its range of deflected movement.

The beam 294 passes through a first focusing lens 296 which images the beam 294 in an image plane 298. The beam 294 then passes through a second focusing lens 300, spaced at a distance from the first focusing lens 296 equal to twice the focal length of each of the lenses. The second focusing lens 300 collimates the diverging beam of light 294. The collimated beam 294 then passes through a diffraction grating 302, positioned at a distance f from the second focus lens 300. The diffraction grating 302 breaks the single collimated beam of light 294 into the desired three beam components to create the three spots of light shown in FIG. 35. It will be appreciated from an inspection of FIG. 36 that the focusing lens arrangement causes the deflected beam of light 294 to pass through the diffraction grating 302 at the same location throughout the scan providing a constant spot configuration.

The divided beam 304 emerging from the diffraction grating 302 then passes through the player diverging lens 306, and the remainder of the optical system is the same as that in a conventional optical disc player apparatus. By adjusting the position of the diverging lens 306 with respect to the grating 302, the amount of movement of the divided beam 304, and hence of the spot produced by the beam 304, represented by arrow 308, can be adjusted.

It will be appreciated from the foregoing that the present invention represents a significant advance in the field of track pitch measuring and monitoring, especially as applied to recording media such as optical discs. In particular, the invention provides an accurate electro-optical technique for obtaining direct measurement of track-to-track spacing in real time as the tracks are scanned. Several embodiments are disclosed for obtaining measurements of different aspects of the measured track-to-track spacing. While several embodiments have been described it should be understood that other modifications may be made without departing from the spirit and scope of the invention. Accordingly, the invention is not to be limited, except as by the appended claims.

I claim:

1. Apparatus for measuring variations in the spacing between adjacent information tracks on an optical information recording medium comprising:
   light means for projecting a spot of light onto said medium such that at least a portion of said spot impinges a first track, the average amount of light from said spot that emerges from the medium in a predetermined direction being proportional to the fraction of said spot which does not impinge said first track;
   photodetector means for providing an electrical signal representative of the amount of the light from said spot emerging from the medium in said predetermined direction, the value of said signal being proportional to the fraction of said spot not impinging said first track;
   tracking means for maintaining a substantially constant lateral spacing of said spot of light from a second track parallel to said first track;
   scanning means for providing relative motion between said light means and said medium in a direction parallel to said second track,
   whereby the variations in the value of said signal are proportional to variations in the spacing between said first track and said second track; and
   means for measuring the variations in the value of said signal.

2. Apparatus according to claim 1 wherein said photodetector means comprises means for providing an electrical signal representative of the amount of light from said spot reflected off of the medium in a predetermined direction.

3. Apparatus according to claim 1, wherein said light means comprises a source of laser light.

4. Apparatus according to claim 3, wherein said light means further comprises an objective lens for imaging said laser light onto the information surface of said recording medium.

5. Apparatus according to claim 4, wherein said photodetector means is positioned so as to detect the light from said spot reflected back through said objective lens.

6. Apparatus according to claim 1, wherein said tracking means comprises:
   second light means for projecting a second and a third spot of light onto different portions of said second track; and
   servo means responsive to the light from said second and said third spots of light reflected off of the medium for maintaining the relative positions of said second and said third spots of light with respect to said second track.

7. Apparatus according to claim 6, wherein said second light means comprises a diffraction grating for separating the light from said first light means into three beams of light associated with said first, second and said third spots of light on said recording medium.

8. Apparatus for measuring the spacing between adjacent information tracks on an optical information recording medium, comprising:
   light beam means for generating a beam of light and directing said beam of light to a spot on said medium, the amount of light from said spot reflected off of the medium in a predetermined direction being indicative of the fraction of said spot impinging an information track;
   photodetector means for providing an electrical signal representative of the amount of light from said spot of light reflected off of the medium in said predetermined direction, the value of said signal indicating the fraction of said spot impinging an information track;
   tracking means for maintaining a substantially constant lateral position of said spot of light with respect to a first track;
   light beam adjustment means for providing controllable adjustment of the direction of said beam of light, whereby said substantially constant lateral position of said spot of light on said medium is controllably located with respect to said first track within a range which includes at least a second track parallel to said first track, whereby the value of said signal and the position of said adjustment means indicate the spacing between said first track and said second track;
   scanning means for providing relative motion between said spot of light and said medium in a direction parallel to said first track; and
   means for measuring the value of said signal.

9. A method for measuring variations in the spacing between adjacent information tracks on an optical information recording medium, comprising the steps:
   projecting a spot of light onto said medium such that at least a portion of said spot impinges a first track, the average amount of light from said spot emerging from the medium in a predetermined direction being proportional to the fraction of said spot which does not impinge said first track;
   generating an electrical signal representative of the amount of light from said spot reflected off of the medium in said predetermined direction, the value of said signal being proportional to the fraction of said spot not impinging said first track;
   maintaining a substantially constant lateral spacing of said spot of light from a second track parallel to said first track;
   providing relative motion between said spot of light and said medium in a direction parallel to said second track,
   whereby the variations in the value of said signal are proportional to variations in the spacing between said first track and said second track; and
   measuring the variations in the value of said signal.

10. A method of measuring the average spacing between adjacent information tracks on an optical information recording medium, comprising the steps of:
   generating a beam of light and directing said beam of light to a spot on said medium, the amount of light from said spot reflected off of said medium in a predetermined direction being indicative of the fraction of said spot impinging an information track;
   providing an electrical signal representative of the amount of light from said spot reflected off of the medium in said predetermined direction, the value of said signal indicating the fraction of said spot impinging an information track;
   maintaining a substantially constant lateral position of said spot of light with respect to a first track;
   providing controllable adjustment of the direction of said beam of light, whereby said substantially constant lateral position of said spot of light on said medium is controllably located with respect to said first track within a range which includes at least a second track parallel to said first track, whereby the value of said signal and the position of said adjustment indicate the spacing between said first track and said second track;
   providing relative motion between said spot of light on said medium in a direction parallel to said first track; and
   measuring the value of said signal.

* * * * *